US006819071B2

(12) United States Patent
Graham et al.

(10) Patent No.: US 6,819,071 B2
(45) Date of Patent: Nov. 16, 2004

(54) AUTOMATIC GARAGE DOOR CLOSING SYSTEM

(76) Inventors: Kenneth B. Graham, 23 Douglas Ridge View SE, Calgary Alberta (CA), T2Z 3C3; Lawrence Chapple, 208 Caterbury Place SW, Calgary Alberta (CA), T2W 1P4

( * ) Notice: Subject to any disclaimer, the term of this patent is extended or adjusted under 35 U.S.C. 154(b) by 0 days.

(21) Appl. No.: 10/248,376

(22) Filed: Jan. 15, 2003

(65) Prior Publication Data

US 2004/0135531 A1 Jul. 15, 2004

(51) Int. Cl.[7] .............................. H02P 1/00; H02P 3/00; H02P 5/00

(52) U.S. Cl. ........................ 318/442; 318/254; 318/266; 318/268; 318/445; 318/466; 318/468; 318/280; 49/26

(58) Field of Search ................................ 318/280–383, 318/254, 266, 268, 442, 445, 466, 468; 49/26

(56) References Cited

U.S. PATENT DOCUMENTS

| | | | | | |
|---|---|---|---|---|---|
| 4,035,702 | A | * | 7/1977 | Pettersen et al. | 318/285 |
| 4,167,833 | A | | 9/1979 | Farina et al. | |
| 4,364,003 | A | * | 12/1982 | Phipps | 318/467 |
| 4,386,398 | A | * | 5/1983 | Matsuoka et al. | 700/90 |
| 4,463,292 | A | * | 7/1984 | Engelmann | 318/283 |
| 4,939,434 | A | * | 7/1990 | Elson | 318/285 |
| 5,278,480 | A | * | 1/1994 | Murray | 318/626 |
| 5,310,010 | A | * | 5/1994 | Lo | 173/178 |
| 5,752,343 | A | | 5/1998 | Quintus | |
| 6,046,562 | A | * | 4/2000 | Emil | 318/484 |
| 6,172,475 | B1 | * | 1/2001 | Fitzgibbon et al. | 318/266 |
| 6,184,787 | B1 | | 2/2001 | Morris | |
| 6,246,196 | B1 | * | 6/2001 | Fitzgibbon et al. | 318/430 |
| 6,278,249 | B1 | * | 8/2001 | Fitzgibbon et al. | 318/268 |
| 6,437,527 | B1 | * | 8/2002 | Rhodes et al. | 318/280 |
| 6,528,961 | B1 | * | 3/2003 | Fitzgibbon et al. | 318/283 |
| 6,563,278 | B2 | * | 5/2003 | Roman | 318/282 |

FOREIGN PATENT DOCUMENTS

| | | | | |
|---|---|---|---|---|
| JP | 2001199373 | * | 7/2000 | E05F/15/10 |

* cited by examiner

*Primary Examiner*—David Martin
*Assistant Examiner*—Tyrone Smith
(74) *Attorney, Agent, or Firm*—John J. Elnitski, Jr.

(57) ABSTRACT

An automatic garage door closing system to be used in combination with a garage door opener. The automatic garage door closing system includes a control box, a power source and a door sensor switch. The control box includes a timer. The timer has a first predetermined time period which is set by a user and activates the garage door opener to close a garage door. The timer has a second predetermined time period which is fixed and which shuts down and resets the automatic garage door closing system. The power source is connected to the control box to activate and power the control box, including the timer of the control box. The door sensor switch senses opening of the garage door and activates the power source to activate the control box.

23 Claims, 2 Drawing Sheets

AUTOMATIC GARAGE DOOR CLOSING SYSTEM

BACKGROUND OF INVENTION

The present invention generally relates to garage door systems. More specifically, the present invention relates to an automatic garage door closing system which can be added to an existing garage door system.

There are garage door systems available with an automatic closing feature. Unfortunately, most of these systems do not appear to be systems which can be easily added to an existing garage door system of the common variety. The current systems can prove difficult for the average home owner to install. Those systems which can be installed by home owner, lack simplicity of use.

It is an object of the present invention to provide an automatic garage door closing system which can be added to an existing garage door system.

SUMMARY OF INVENTION

An automatic garage door closing system to be used in combination with a garage door opener. The automatic garage door closing system includes a control box, a power source and a door sensor switch. The control box includes a timer. The timer has a first predetermined time period which is set by a user and activates the garage door opener to close a garage door. The timer has a second predetermined time period which is fixed and which shuts down and resets the automatic garage door closing system. The power source is connected to the control box to activate and power the control box, including the timer of the control box. The door sensor switch senses opening of the garage door and activates the power source to activate the control box.

DETAILED DESCRIPTION

Figure 1:
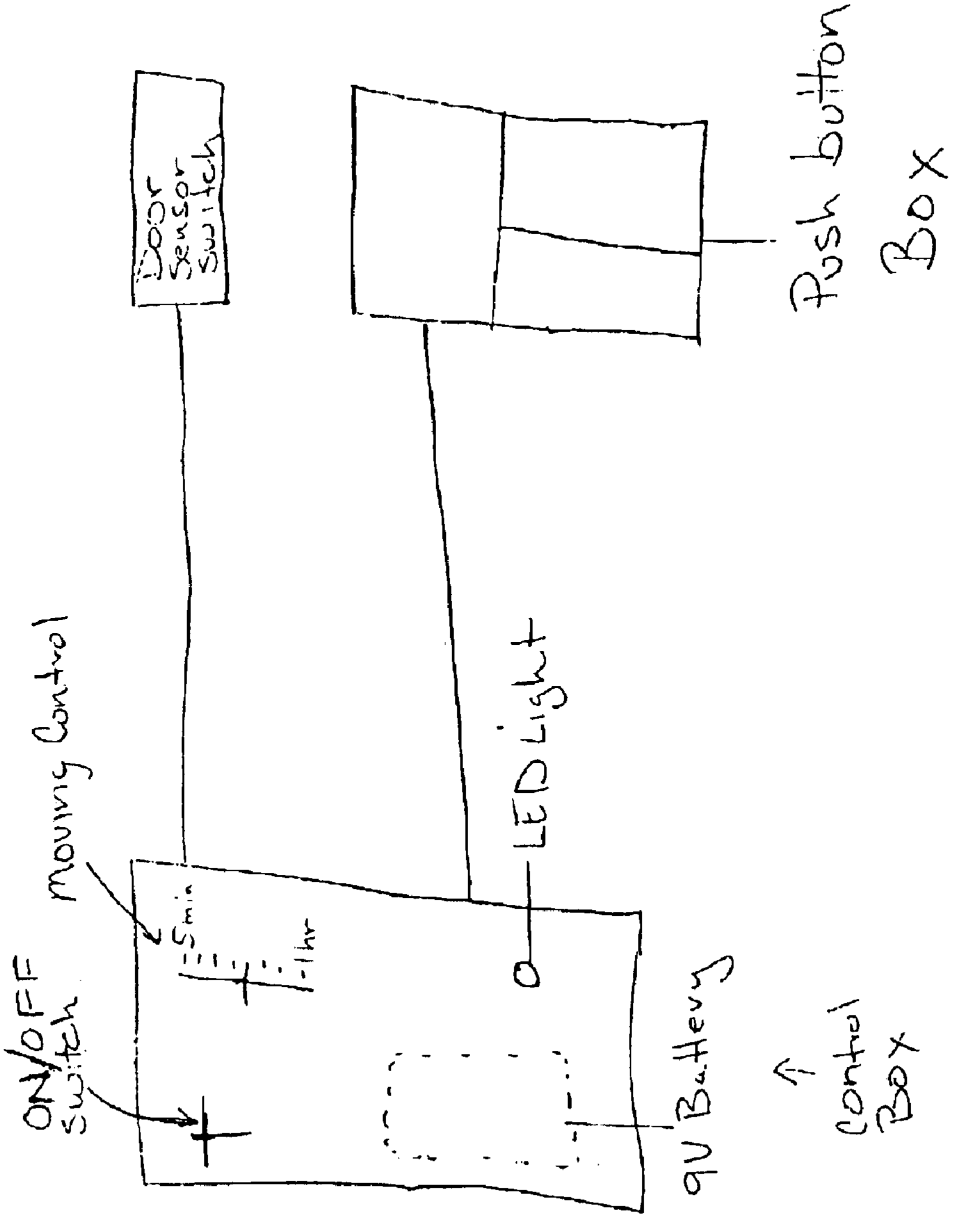
FIG. 1 is a schematic view of components of an automatic garage door closing system according to the present invention.
Figure 2:
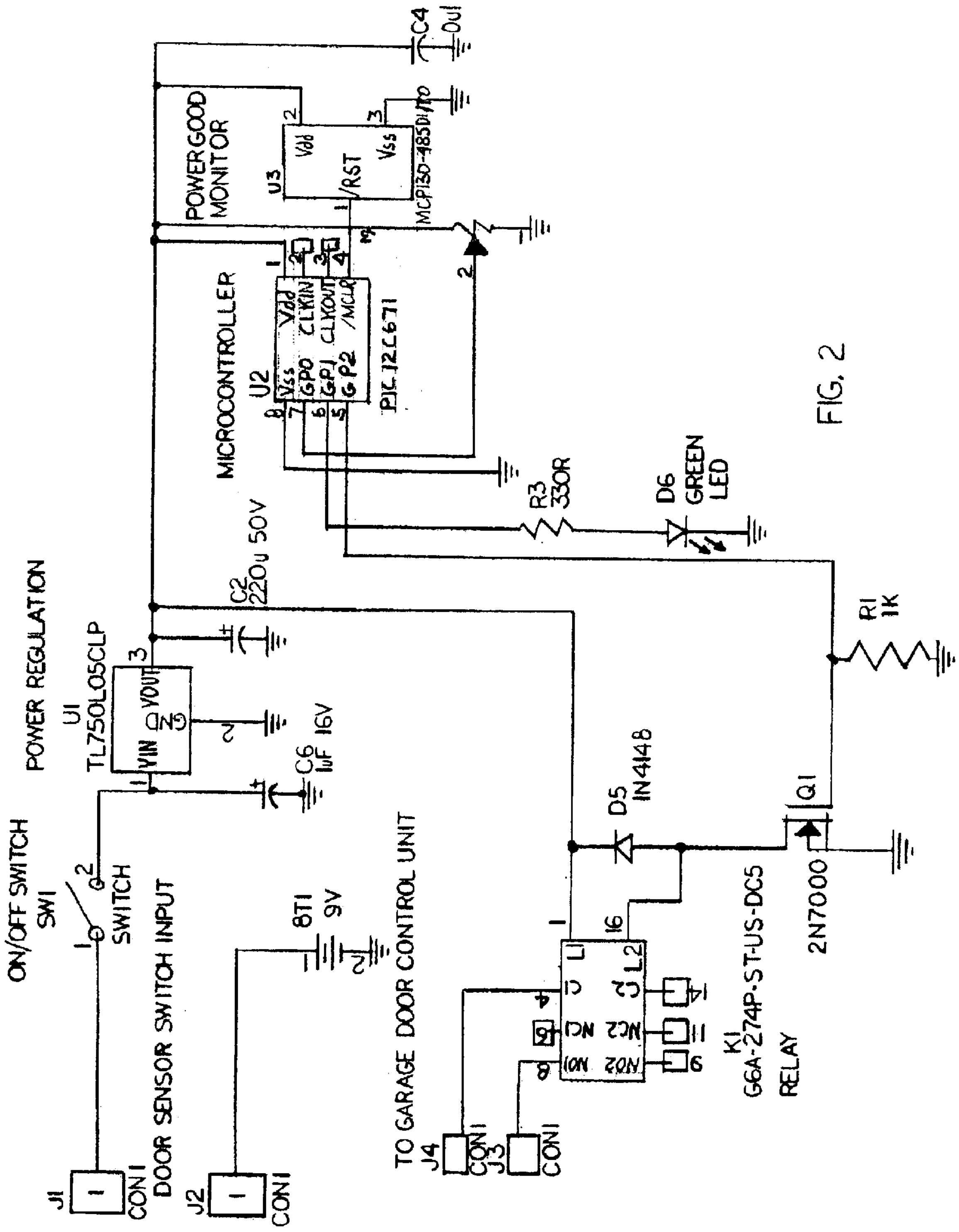
FIG. 2 is a schematic view of an example of circuitry that can be used with the automatic garage door closing system according to the present invention.

The present invention is an automatic garage door closing system, as shown in FIGS. 1–2. FIG. 1 shows a schematic of the components that make up the automatic garage door closing system. FIG. 2 shows a schematic of an example of the circuitry that can be used with the automatic garage door closing system. The automatic garage door closing system is shown wired to an existing push button box that is part of an existing garage door switch in a garage door opener. The automatic garage door closing system includes a power source, door sensor switch and a control box. The power source is linked to the control box to power the automatic garage door closing system. The door sensor switch is connected to the control box and mounted near the garage door to sense the opening and closing movement of the garage door. The door sensor switch can be a magnetic switch, micro-switch or other similar device. Part of the door sensor switch can actually mounted on the garage door, as such would be the case with a magnetic switch. The control box is mounted in a convenient location in the garage, where it can be easily accessed by a user.

The control box is the brains of the automatic garage door closing system. The power source is shown within the control box as a nine Volt (9V) battery. The control box includes an ON/OFF switch, timer, LED light, relay switching device and relay. The ON/OFF switch interrupts the power source in order to turn the automatic garage door closing system on and off. The ON/OFF switch includes a toggle lever external to the control box. The timer is comprised of a microprocessor and a potentiometer. The potentiometer includes a moving control external to the control box. The microprocessor is programmed to countdown a first predetermined time period, depending on the position of the moving control of the potentiometer. The microprocessor includes an output to power the LED light. The microprocessor is connected to the door sensor switch. The microprocessor is also programmed to perform a countdown of a second predetermined time period. The relay switching device is shown as Metal Oxide Semiconductor Field Effect Transistor (MOSFET). The switching device is used to switch the relay on and off when commanded by the microprocessor. The relay is connected to the existing garage door switch of a garage door opener, where in the case of FIGS. 1–2, the relay is shown connected to a push button box.

The operation of the automatic garage door closing system is as follows. The garage door is opened by activating the existing garage door switch of the garage door opener by using the push button box wired to the garage door opener or a wireless push button device (not shown). During opening movement of the garage door, the door sensor switch will be activated and be switched to a closed position. When the door sensor switch closes, the microprocessor is powered by the power source. The ON/OFF switch of the control box must be in the ON position to allow the microprocessor to be powered by the power source. If the ON/OFF switch is in the OFF, position the microprocessor will not be powered and the garage door will remain open. The control box includes an time indication scale of time next to the moving control of the potentiometer. Typical time settings are between five minutes to one hour. Whereby, the position of the moving control along the time indication scale is also a position of the moving control along a wiper of the potentiometer. The moving control can be a sliding lever or a rotating knob. When the microprocessor is powered, the microprocessor reads the voltage level on the wiper of the potentiometer and interprets this voltage level as a time period, as indicated by the sliding lever along the time indication scale. This interpretation of a time period in relation to voltage level is due to the programming of the microprocessor. The microprocessor then begins a countdown of the first predetermined time period, as set by the moving control. At the end of the first predetermined time period, the microprocessor outputs a logic High five volt (5V) to a gate of the relay switching device, which turns on the relay by closing the relay. Activation of the relay shorts together the terminals of the existing push button box that is wired to the garage door opener. The shorting of the terminals of the existing push button box activates a command in the garage door opener to close the garage door. When the relay is turned on, the microprocessor begins a countdown of the second predetermined time period of five-hundred milliseconds. After the countdown of the second predetermined time period, the microprocessor turns off the relay by opening the relay, which removes the short from the terminals of the existing push button box. As the garage door passes the door sensor switch while closing, the door sensor switch is again activated due to door movement and opens the door sensor switch. Opening of the door sensor switch removes the power from the microprocessor, ceases operation of the microprocessor and resets the automatic garage door closing system. The microprocessor will only be restarted by the opening of the garage door. Between the period of powering of the microprocessor and removal of power to the microprocessor, the output to power the LED light causes the LED light to blink periodically to indicate the battery for the power source is adequate and the automatic garage door closing system is functioning. The blinking of the LED light and monitoring of the power source and the system are all part of the programming of the microprocessor.

The following are alternatives which can be added to the above-mentioned embodiment. Instead of connecting the relay to the existing push button box of the garage door opener, the relay could be directly connected to the garage door opener to close the garage door. The connecting of the relay to the existing push button box of the garage door opener provides a simpler installation for the home owner. Whereby, a replacement push button box with the proper connections to the control box and existing garage door opener could be provided as part of a kit to replace the existing push button box. Finally, the power source could be a direct AC electrical power source, possibly from the garage door opener itself.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. An automatic garage door closing system to be used in combination with a garage door opener, comprising:

a control box, said control box including a timer, said timer having a first predetermined time period which is set by a user and activates said garage door opener to close a garage door after said first predetermined time period has ended, said timer having a second predetermined time period which is fixed, and said timer discontinues activation of said garage door opener and resets said automatic garage door closing system after said second predetermined time period has ended;

a power source connected to said control box to activate and power said control box, including said timer of said control box; and a door sensor switch, said door sensor sensing opening of said garage door and activates said power source to activate said control box and said door sensor sensing closing of said garage door and deactivates said power source to deactivate said control box.

2. The automatic garage door closing system of claim 1, wherein said power source is a battery located in said control box.

3. The automatic garage door closing system of claim 1, further including an LED light as part of said control box and connected to components of said control box to indicate power source status and that said control box is functioning during said first and second predetermined time periods.

4. The automatic garage door closing system of claim 1, further including an external ON/OFF switch to activate and deactivate said power source from said control box.

5. The automatic garage door closing system of claim 1, wherein said timer is a combination of a microprocessor and a potentiometer connected together, wherein microprocessor is programmed to countdown said first and second predetermined time periods; wherein microprocessor is programmed to activate and deactivate said garage door opener; and wherein said potentiometer is connected to said microprocessor to be set by said user to determine said first predetermined time period.

6. The automatic garage door closing system of claim 5, wherein said potentiometer includes an external moving control along a time indication scale, said moving control connected to said potentiometer to control amount of time of said first predetermined time period.

7. The automatic garage door closing system of claim 1, wherein said first predetermined time period is between five minutes and one hour.

8. The automatic garage door closing system of claim 1, wherein said second predetermined time period is five-hundred milliseconds.

9. The automatic garage door closing system of claim 7, wherein said second predetermined time period is five-hundred milliseconds.

10. The automatic garage door closing system of claim 1, wherein said control box includes a relay; wherein said relay is activated by said timer after said first predetermined time period has ended; wherein said relay activates a push button box in response to activation by said timer; wherein said push button is connected to said garage door opener and commands said garage door opener to close said garage door in response to activation by said relay; and wherein said timer deactivates said relay after said second predetermined time period has ended which also deactivates said push button box.

11. The automatic garage door closing system of claim 5, wherein said control box includes relay switching device and a relay; wherein said relay switching device is activated at an end of said first predetermined time period by said microprocessor; wherein activation of said relay switching device activates said relay; wherein activation of said relay activates a push button box which is connected to said garage door opener and which commands said garage door opener to close said garage door; and wherein said microprocessor deactivates said relay switching device after said second predetermined time period has ended which also deactivates said relay and said push button box.

12. The automatic garage door closing system of claim 1, wherein said power source is a battery located in said control box; wherein said timer is a combination of a microprocessor and a potentiometer connected together; wherein microprocessor programmed to countdown said first and second predetermined time periods; wherein microprocessor is programmed to activate and deactivate said garage door opener; and wherein said potentiometer is connected to said microprocessor to be set by said user to determine said first predetermined time period; and wherein said potentiometer includes an external moving control along a time indication scale, said moving control connected to said potentiometer to control amount of time of said first predetermined time period.

13. The automatic garage door closing system of claim 12, further including an LED light as part of said control box and connected to components of said control box to indicate power source status and that said control box is functioning during said first and second predetermined time periods.

14. The automatic garage door closing system of claim 12, further including an external ON/OFF switch to activate and deactivate said power source from said control box.

15. The automatic garage door closing system of claim 12, further including an LED light as part of said control box and connected to components of said control to indicate power source status and that said control box is functioning during said first and second predetermined time periods; and further including an external ON/OFF switch to activate and deactivate said power source from said control box.

16. The automatic garage door closing system of claim 12, wherein said first predetermined time period is between five minutes and one hour; and wherein said second predetermined time period is five-hundred milliseconds.

17. The automatic garage door closing system of claim 15, wherein said first predetermined time period is between five minutes and one hour; and wherein said second predetermined time period is five-hundred milliseconds.

18. The automatic garage door closing system of claim 17, wherein said door sensor switch is a micro switch.

19. The automatic garage door closing system of claim 17, wherein said door sensor switch is a magnetic switch.

20. The automatic garage door closing system of claim 17, wherein said control box includes relay switching device and a relay; wherein said relay switching device is activated at an and of said first predetermined time period by said microprocessor; wherein activation of said relay switching device activates said relay; wherein activation of said relay activates a push button box which is connected to said garage door opener and which commands said garage door opener to close said garage door; and wherein said microprocessor deactivates said relay switching device after said second predetermined time period has ended which also deactivates said relay and said push button box.

21. An automatic garage door closing system kit to be added to a garage door opener, comprising:

a control box, said control box including a timer, said timer having a first predetermined time period which is set by a user and activates said garage door opener to close a garage door after said first predetermined time period has ended, said timer having a second predetermined time period which is fixed, and said timer discontinues activation of said garage door opener and resets said automatic garage door closing system after said second predetermined time period has ended;

a power source connected to said control box to activate and power said control box, including said timer of said control box;

a door sensor switch, said door sensor sensing opening of said garage door and activates said power source to activate said control box and said door sensor sensing closing of said garage door and deactivates said power source to deactivate said control box;

a replacement pushbutton box to replace an existing pushbutton box of said garage door opener, said replacement pushbutton box connected to said control box and connected to said garage door opener, such that said control box commands said garage door opener to close said garage door after said first predetermined time period has ended.

22. The automatic garage door closing system kit of claim 21, wherein said power source is a battery located in said control box; wherein said timer is a combination of a microprocessor and a potentiometer connected together; wherein microprocessor is programmed to countdown said first and second predetermined time periods; wherein microprocessor is programmed to activate and deactivate said garage door opener; wherein said potentiometer is connected to said microprocessor to be set be said user to determine said first predetermined time period; wherein said potentiometer includes an external moving control along a time indication scale, said moving control connected to said potentiometer to control amount of time of said first predetermined time period; wherein said control box includes a relay; wherein said relay is activated by said microprocessor after said first predetermined time period has ended; wherein said relay activates said replacement push button box in response to activation by said microprocessor; wherein said replacement push button is connected to said garage door opener and commands said garage door opener to close said garage door in response to activation by said relay; and wherein said microprocessor deactivates said relay after said second predetermined time period has ended which also deactivates said replacement push button box.

23. The automatic garage door closing system of claim 22, further including an LED light as part of said control box and connected to components of said control box to indicate power source status and that said control box is functioning during said first and second predetermined time periods; and further including an external ON/OFF switch to activate and deactivate said power source from said control box.

* * * * *